United States Patent
Hummel et al.

(10) Patent No.: US 10,182,123 B2
(45) Date of Patent: Jan. 15, 2019

(54) SYSTEM AND METHOD FOR PROVIDING CONTEXT-BASED THIRD-PARTY CONTENT

(71) Applicant: Google Inc., Mountain View, CA (US)

(72) Inventors: Patrick Hummel, Cupertino, CA (US); Hal Ronald Varian, Danville, CA (US)

(73) Assignee: Google LLC, Mountain View, CA (US)

( * ) Notice: Subject to any disclaimer, the term of this patent is extended or adjusted under 35 U.S.C. 154(b) by 577 days.

(21) Appl. No.: 14/662,188

(22) Filed: Mar. 18, 2015

(65) Prior Publication Data

US 2016/0277516 A1 Sep. 22, 2016

(51) Int. Cl.
*H04L 29/08* (2006.01)
*G06Q 30/02* (2012.01)

(52) U.S. Cl.
CPC ......... *H04L 67/20* (2013.01); *G06Q 30/0251* (2013.01); *G06Q 30/0275* (2013.01); *G06Q 30/0277* (2013.01); *H04L 67/06* (2013.01)

(58) Field of Classification Search
USPC ......................................................... 709/217
See application file for complete search history.

(56) References Cited

U.S. PATENT DOCUMENTS

| | | | |
|---|---|---|---|
| 2002/0123334 A1* | 9/2002 | Borger | G06Q 30/02 455/419 |
| 2006/0293995 A1 | 12/2006 | Borgs et al. | |
| 2009/0083098 A1 | 3/2009 | Schwarz | |
| 2014/0006144 A1 | 1/2014 | Pardoe et al. | |
| 2015/0006310 A1* | 1/2015 | Murugappan | G06Q 30/08 705/26.3 |
| 2015/0046278 A1* | 2/2015 | Pei | H04L 67/36 705/26.3 |
| 2015/0046467 A1 | 2/2015 | Hummel et al. | |
| 2015/0195593 A1* | 7/2015 | Hoyne | H04N 21/6582 725/19 |
| 2015/0213511 A1* | 7/2015 | Kee | G06Q 30/0256 705/14.71 |

(Continued)

OTHER PUBLICATIONS

Abraham, Itai, Susan Athey, Moshe Babaioff, and Michael Grubb. "Peaches, Lemons, and Cookies: Designing Auction Markets with Dispersed Information". Microsoft Research Typescript, May 16, 2014.

(Continued)

*Primary Examiner* — Umar Cheema
*Assistant Examiner* — John Fan
(74) *Attorney, Agent, or Firm* — Foley & Lardner LLP

(57) ABSTRACT

Systems and methods of the present disclosure can provide an improved user experience on client devices selecting to receive context-based third-party content by reducing the number of third-party content items presented for display on such client devices. A data processing system can be configured to employ an auction mechanism with selection criterion thresholds (such as minimum bid values) that result, when used in auctions, in enforcing a limit on the amount of third-party content presented for display on client devices that have selected to receive context-based third-party content. The selection criterion thresholds can result, when used in auctions, in enforcing minimum revenues for publishers. The selection criterion thresholds can be determined offline based on historical statistical parameters.

20 Claims, 5 Drawing Sheets

(56) References Cited

U.S. PATENT DOCUMENTS

| | | | |
|---|---|---|---|
| 2015/0278868 A1* | 10/2015 | O'Connor | G06Q 30/0263 705/14.41 |
| 2016/0050129 A1* | 2/2016 | Hoyne | H04L 43/08 709/224 |
| 2016/0162938 A1* | 6/2016 | LeBeau | G06Q 30/0255 705/14.53 |

OTHER PUBLICATIONS

Babaioff, Moshe, Robert Kleinberg, and Renato Paes Leme. "Optimal Mechanisms for Selling Information". Proceedings of the 13th ACM Conference on Electronic Commerce (EC) 92-109, 2012.

Bergemann, Dirk and Alessandro Bonatti. "Targeting in Advertising Markets: Implications for Offline vs. Online Media". RAND Journal of Economics vol. 42 No. 3, pp. 414-443, Mar. 2010.

Bergemann, Dirk and Martin Pesendorfer. "Information Structures in Optimal Auctions". Journal of Economic Theory, vol. 137 No. 1, pp. 580-609, Jan. 2007.

Bhawalkar, Kshipra, Patrick Hummel, and Sergei Vassilvitskii. "Value of Targeting". Proceedings of the 7th International Symposium on Algorithmic Game Theory (SAGT), pp. 194-205, Jul. 15, 2014.

Board, Simon. "Revealing Information in Auctions: The Allocation Effect". Economic Theory, vol. 38, No. 1, pp. 125-135, 2009.

Emek, Yuval, Michal Feldman, Ifah Gamzu, Renato Paes Leme, and Moshe Tennenholtz. "Signaling Schemes for Revenue Maximization". Proceedings of the 13th ACM Conference on Electronic Commerce (EC) 13: pp. 514-531, 2012.

Eso, Peter and Balazs Szentes. "Optimal Information Disclosure in Auctions and the Handicap Auction". Review of Economic Studies. vol. 74 No. 3, pp. 705-731. 2007.

Fu, Hu, Patrick Jordan, Mohammad Mandian, Uri Nadav, Inbal Talgam-Cohen, and Sergei Vassilvitskii. "Ad Auctions with Data". Proceedings of the 5th International Symposium on Algorithmic Game Theory (SAGT), pp. 184-189, 2012.

Ganuza, Juan-Jose and Jose S. Penalva. "Signal Orderings Based on Dispersion and the Supply of Private Information in Auctions". Econometrica 78(3): 1007-1030, Dec. 22, 2007.

Ganuza, Juan-Jose. "Ignorance Promotes Competition: An Auction Model with Endogenous Private Valuations". RAND Journal of Economics, vol. 35, No. 3 pp. 583-598, Mar. 2003.

Ghosh, Arpita, Mohammad Mandian, Kishore Papineni, and Sergei Vassilvitskii. "To Match or not to Match: Economics of Cookie Matching in Online Advertising". Proceedings of the Fifth International Workshop on Internet and Network Economics (WINE) 208-219, Jun. 4-8, 2012.

Hart, Sergiu and Noam Nisan. "Approximate Revenue Maximization with Multiple Items". Hebrew University of Jerusalem Typescript., May 28, 2014.

Hummel, Patrick and R. Preston McAfee. "When Does Improved Targeting Increase Revenue?" Google Inc. Typescript, 2014.

Hummel, Patrick. "Position Auctions with Dynamic Resizing". Google, Inc. Dec. 17, 2014.

Jehiel, Phillipe, Moritze Meyer-ter-Vehn, and Benny Moldovanu. "Mixed Bundling Auctions". Journal of Economic Theory, vol. 134, No. 1, pp. 494-512, Jun. 2, 2006.

Milgrom, Paul R. and Robert J. Weber. "A Theory of Auctions and Competitive Bidding". Econometrica vol. 50, No. 5, pp. 1089-1122, 1982.

Palfrey, Thomas. "Bundling Decisions by a Multiproduct Monopolist with Incomplete Information". Econometrica vol. 51, No. 2, pp. 463-483, Mar. 1983.

International Search Report & Written Opinion on PCT/US2016/018904 dated May 6, 2016.

International Preliminary Report on Patentability for PCT/US2016/018904 dated Sep. 19, 2017. (7 pages).

Notification Concerning Transmittal of International Search Report on Patentability (Chapter I of the Patent Cooperation Treaty) for PCT/US2016/018904 dated Sep. 28, 2017. (1 page).

* cited by examiner

SYSTEM AND METHOD FOR PROVIDING CONTEXT-BASED THIRD-PARTY CONTENT

BACKGROUND

In a networked environment, such as the Internet or other networks, first-party content providers can provide information for public presentation on resources, for example webpages, documents, applications, geographic maps or other resources. The first-party content can include information provided by the first-party content providers via, for example, a resource server for presentation on a client device over the Internet. The first-party content may be a webpage requested by the client device or a stand-alone application (e.g., a video game, a chat program, or navigation application) running on the client device. Additional third-party content can also be provided by third-party content providers for presentation on the client device together with the first-party content provided by the first-party content providers. Thus, a person viewing a resource can access the first-party content that is the subject of the resource as well as the third-party content that may or may not be related to the subject matter of the resource.

SUMMARY

Implementations described herein relate to providing online content of a plurality of products for display on client devices. In particular, implementations described herein relate to generating and providing for display a bundle of a plurality of products each associated with a plurality of sellers in response to a search query.

At least one aspect relates to a method for providing third-party content. The method includes determining, by a data processing system, at least one statistical parameter associated with a distribution of a selection criterion for a publisher group and a device group, the publisher group including one or more publishers and the device group including one or more client computer devices that have selected to receive context-based third-party content. The method includes the data processing system obtaining an indication of a limit of an amount of third-party content for display to a client computer device in the device group and obtaining a minimum publisher revenue value for a publisher in the publisher group. The method includes the data processing system determining a selection criterion threshold value based on the at least one statistical parameter, the limit of the amount of third-party content for display to the client computer device and the minimum publisher revenue value. The method includes the data processing system receiving one or more bids for providing third-party content for display on the client computer device with other content associated with the publisher. Each bid associated is with a respective third-party content item. The method includes the data processing system determining a bidding score for each third-party content item associated with a respective bid. The method also includes the data processing system determining that at least one of the one or more bidding scores exceeds or is equal to the selection criterion threshold value and, in response, selecting a third-party content item associated with a bidding score exceeding or equal to the selection criterion threshold value as a candidate for display to the client computer device with the other content associated with the publisher.

At least one aspect relates to a data processing system for providing third-party content. The data processing can include a memory for storing computer code instructions and a processor. The processor is configured to perform several operations. The operations include determining, by a data processing system, at least one statistical parameter associated with a distribution of a selection criterion for a publisher group and a device group, the publisher group including one or more publishers and the device group including one or more client computer devices that have selected to receive context-based third-party content. The operations include obtaining an indication of a limit of an amount of third-party content for display to a client computer device in the device group and obtaining a minimum publisher revenue value for a publisher in the publisher group. The operations include determining a selection criterion threshold value based on the at least one statistical parameter, the limit of the amount of third-party content for display to the client computer device and the minimum publisher revenue value. The operations include receiving one or more bids for providing third-party content for display on the client computer device with other content associated with the publisher. Each bid is associated with a respective third-party content item. The operations include determining a bidding score for each third-party content item associated with a respective bid. The operations also include determining that at least one of the one or more bidding scores exceeds or is equal to the selection criterion threshold value and, in response, selecting a third-party content item associated with a bidding score exceeding or equal to the selection criterion threshold value as a candidate for display to the client computer device with the other content associated with the publisher.

At least one aspect relates to a computer readable storage device storing instructions that, when executed by one or more processors, cause the one or more processors to perform several operations for providing third-party content. The operations include determining, by a data processing system, at least one statistical parameter associated with a distribution of a selection criterion for a publisher group and a device group, the publisher group including one or more publishers and the device group including one or more client computer devices that have selected to receive context-based third-party content. The operations include obtaining an indication of a limit of an amount of third-party content for display to a client computer device in the device group and obtaining a minimum publisher revenue value for a publisher in the publisher group. The operations include determining a selection criterion threshold value based on the at least one statistical parameter, the limit of the amount of third-party content for display to the client computer device and the minimum publisher revenue value. The operations include receiving one or more bids for providing third-party content for display on the client computer device with other content associated with the publisher. Each bid is associated with a respective third-party content item. The operations include determining a bidding score for each third-party content item associated with a respective bid. The operations also include determining that at least one of the one or more bidding scores exceeds or is equal to the selection criterion threshold value and, in response, selecting a third-party content item associated with a bidding score exceeding or equal to the selection criterion threshold value as a candidate for display to the client computer device with the other content associated with the publisher.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

Figure 1:
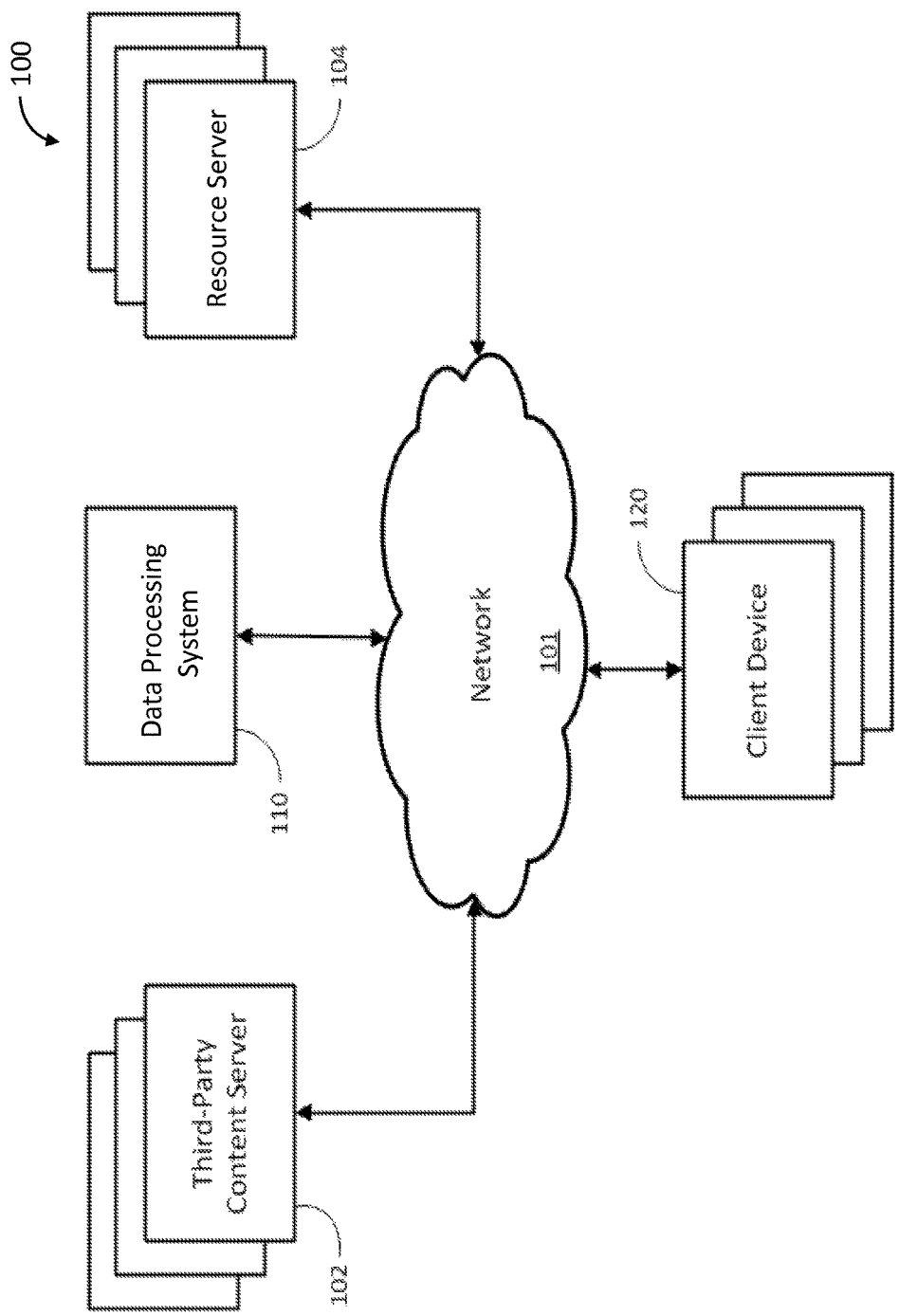
FIG. 1 is an overview depicting an implementation of a system of providing information via a computer network.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

A computing device (e.g., a client device) can access a resource for display, such as a webpage, a document, an application or a geographic map, for example. The computing device can access the resource via the Internet by communicating with a server, such as a webpage server, corresponding to that resource. The resource can include first-party content that is the subject of the resource from a first-party content provider and may also include additional third-party provided content, such as advertisements or other content. A webpage server or a client device can communicate with a data processing system, such as a content item selection system, to request a content item to be presented with a requested webpage, such as through the execution of code of the resource to request a third-party content item to be presented with the resource. The data processing system can select a third-party content item and provide data to effect presentation of the content item with the requested webpage on a display of the client device. In some instances, the content item is selected and served with a resource associated with a search query response. For example, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. Responsive to use of the application, a resource server or a client device can communicate with a data processing system, such as a content item selection system, to request a content item to be presented with a user interface of the application or otherwise. The data processing system can select a third-party content item and provide data to effect presentation of the content item with the application on a display of the client device.

A device identifier may be associated with the client device. The device identifier may be a randomized or pseudo-randomized number associated with the client device to identify the device during subsequent requests for resources or content items. The device identifier can store or cause the client device to transmit information related to the client device to the data processing system or resource server (e.g., values of sensor data, a web browser type, an operating system, historical resource requests, historical content item requests, etc.).

In situations in which the systems discussed herein collect personal information about users, or may make use of personal information, the users can be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the data processing system in an auction to select and serve content items for presentation with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other examples, a third-party content provider may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the data processing system uses content item interaction data to determine the performance of the third-party content provider's content items. For example, users may be more inclined to click on third-party content items on certain webpages over others. Accordingly, auction bids to place the third-party content items may be higher for high-performing webpages, categories of webpages, or other criteria, while the bids may be lower for low-performing webpages, categories of webpages, or other criteria.

In some instances, one or more performance metrics for the third-party content items may be determined and indications of such performance metrics may be provided to the third-party content provider via a user interface for the content item management account. For example, the performance metrics may include a cost per impression (CPI) or cost per thousand impressions (CPM), where an impression may be counted, for example, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), or other performance metrics may be used.

In some instances, a webpage or other resource (such as, for example, an application) includes one or more content item slots in which a selected and served third-party content item may be displayed. The code (e.g., JavaScript®, HTML, etc.) defining a content item slot for a webpage or other resource may include instructions to request a third-party content item from the data processing system to be presented with the webpage. In some implementations, the code may include an image request having a content item request URL that may include one or more parameters (e.g., /page/contentitem?devid=abc123&devnfo=A34r0). Such parameters may, in some implementations, be encoded strings such as "devid=abc123" or "devnfo=A34r0."

The selection of a third-party content item to be served with the resource by a data processing system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the data processing system through an auction.

During an auction for a content item slot for a resource, such as a webpage, several different types of bid values may be utilized by third-party content providers for various third-party content items. For example, an auction may include bids based on whether a user clicks on the third-party content item, whether a user performs a specific action based on the presentation of the third-party content item, whether the third-party content item is selected and served, or other types of bids. For example, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid or adjusted for other reasons. For example, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or a normalized value, may be generated to be used in the auction based on the bid value and the probability or another modifying value. In the prior example, the value or score for a bid based on whether the third-party content item is selected and served may be $0.005*1.00=0.005 and the value or score for a bid based on whether a user performs a specific action may be $5*0.002=0.01. To maximize the income generated, the data processing system may select the third-party content item with the highest value from the auction. In the foregoing example, the data processing system may select the content item associated with the bid based on whether the user performs the specific action due to the higher value or score associated with that bid.

Once a third-party content item is selected by the data processing system, data to effect presentation of the third-party content item on a display of the client device may be provided to the client device using a network. In the present disclosure, the term "product item" is used interchangeably to refer to a physical product item or electronic content (such as text, image, video or a combination thereof) associated with (or indicative of) a corresponding physical product item.

Systems and methods of the present disclosure can provide an improved online user experience on client devices selecting to affirmatively receive context-based third-party content by reducing the amount of third-party content presented on such client devices. The data processing system, such as a content item selection system, can be configured so that client devices that affirmatively select to receive context-based third-party content are provided with third-party online content on a reduced fraction of visits to publishers' domains (such as websites, social networks, gaming platforms or search engines) by such client devices. A client device selecting to receive context-based third-party content can receive less third-party content, but the third-party content that is received by the client device may be more relevant to users of the client devices.

While reducing third-party content provided for display on client devices selecting to receive context-based third-party content can be an appealing incentive to many users of client devices, such reduction can pose technical and fundamental challenges with regard to operations of an online content delivery system. First, contrary to apparent goals (of third-party content providers and publishers) to be satisfied by the data processing system, such reduction can result in fewer total presentations of at least some third-party content items, which could lead to reduced revenue for publishers and possible unsatisfactory impression rates for third-party content providers.

To overcome such challenges, the data processing system in the current disclosure can employ an auction mechanism that allows a reduction in the amount of third-party content provided for display on client devices that have selected to receive context-based third-party content. The auction mechanism can achieve such reduction by using reserve prices (also referred to as minimum bid values) for client device-publisher pairs to ensure that for a fraction of the queries associated with each client device, no third-party content items are provided for display on the respective client device. That is, the data processing system can select the reserve prices in a way to ensure that candidate bids from different third-party content providers fail to meet such reserve prices often enough such that third-party content items are provided for display to any client device that have selected to receive context-based third-party content in only a fraction of the queries associated with that client device.

The data processing system can construct the auction mechanism (or compute the reserve prices) by using an optimization formulation that maximizes a cumulative gain (also referred to as economic welfare) for publishers and third-party content providers subject to a constraint that enforces reduction in the number of third-party content items provided for display to each client device selecting to receive context-based third-party content. The gain for publishers can be defined in terms of publishers' revenue. The gain for third-party content providers (also referred to as economic efficiency) can be defined in terms of the differences between the bid values made by the third-party content providers and the respective actual paid prices for having respective third-party content displayed on client devices. The cumulative gain can be a weighted average of publishers' revenues and economic efficiency for third-party content providers. In some implementations, the optimization formulation can also include another constraint to ensure a minimum publisher revenue for each publisher. In some implementations, instead of enforcing a minimum publisher revenue for each publisher, the data processing system can be configured to boost revenue for low-revenue publishers using extra money generated by well performing publishers.

The data processing system can collect bidding data for previous auctions associated with different client device-publisher pairs. Based on the collected data, the data processing system can generate statistical parameters (such as cumulative distribution function values and probability density function values) associated with client device-publisher pairs. In some implementations, the data processing system can classify client devices and publishers into a plurality of device groups and a plurality of publisher groups and can generate the statistical parameters in association with each group pair including a device group and a publisher group. Using the generated statistical parameters, the data processing system can compute the reserve prices (or generally selection criterion thresholds). For instance, the data processing system can use the generated statistical parameters to construct an optimization formulation (or an optimization problem) that maximizes a gain function (for instance, defined in terms of average publisher revenues and economic efficiency averages for publishers) subject to a constraint to enforce a reduction in the number of third-party content items presented to each client device selecting to receive context-based third-party content. The optimization formulation can also be subject to a further constraint enforcing a minimum publisher revenue for each publisher. The data processing system can then compute the reserve prices by solving the optimization problem.

The data processing system can perform the process of collecting data and computing the reserve prices (or selection criterion thresholds) offline and use the computed reserve prices in online auctions. Once the reserve prices are computed, the data processing system can adopt the computed reserve prices as part of the auction mechanism to select third-party content items for presenting on client devices that have selected to receive context-based third-party content. As such, the reduction in the number of third-party content items for presenting on client devices selecting to receive context-based third-party content can be achieved by modifying default reserve prices with the computed reserve prices in the auction mechanism.

The benefit of reducing the amount of third-party content for presenting to client devices selecting to receive context-based third-party content in conjunction with maximizing economic welfare for publishers and third-party content providers or enforcing minimum publisher revenues for publishers can outweigh (or at least partially compensate for) the cost of having fewer third-party content items provided for display on client devices selecting to receive context-based third-party content. For instance, by maximizing economic welfare for publishers and third-party content providers or enforcing minimum revenues for publishers, the data processing system allows publishers to make up for any lost revenue due to the reduction in the number of third-party content items provided for display on client devices. Also, the data processing system allows third-party content providers to make use of context-based third-party content delivery to achieve a higher impression rate (such as in association with client devices selecting to receive context-based third-party content) while enjoying price discounts compared to respective bid values.

While the foregoing has provided an overview of providing context-based third-party content while reducing the amount of third-party content provided for display on client devices receiving such third-party content, processes and computer systems described in the current disclosure provide illustrative implementations of an auction mechanism that enforces reduction in the amount of third-party content provided for display on client devices selecting to receive context-based third-party content while maximizing economic welfare for publishers and third-party content providers. The auction mechanism can also enforce minimum revenues for publishers. Context-based third-party content can include third-party content selected (or to be selected) for display on a client device based on information associated with that client device (such as common characteristics information, preferences, online activity data, location or a combination thereof).

A data processing system can collect data for bid values (or auction scores) in auctions associated with client device-publisher pairs and compute statistical parameters thereof. For client devices selecting to receive context-based third-party content, the data processing system can derive a selection criterion threshold, such as a reserve price or a minimum bid value, for use in selecting third-party content items for each client device-publisher pair based on the respective computed statistical parameter(s). The selection criterion thresholds for different client device-publisher pairs can be derived according to a formulation that guarantees reduction in third-party content items provided for display on client devices selecting to receive context-based third-party content and maximizes economic welfare for third-party content providers and publishers. The data processing system (or a computer system coupled thereto) can collect the data and derive the selection criteria thresholds offline. The data processing system can then employ the selection criterion thresholds in online auctions to select third-party content items for display on client devices that have selected to receive context-based third-party content. As such, the reduction in the amount of third-party content provided for display on client devices that have selected to receive context-based third-party content is achieved without significantly affecting the complexity of the online auction operations performed by the data processing system.

FIG. 1 is a block diagram of an implementation of a system 100 for providing information via at least one computer network such as the network 101. The network 101 may include a local area network (LAN), wide area network (WAN), a telephone network, such as the Public Switched Telephone Network (PSTN), a wireless link, an intranet, the Internet, or combinations thereof. The system 100 can also include at least one data processing system, such as a content item selection system 110. The data processing system 110 can include at least one logic device, such as a computing device having a data processor, to communicate via the network 101, for example with a resource server 104, a client device 120, or a third-party content server 102. The data processing system 110 can include one or more data processors, such as a content placement processor, configured to execute instructions stored in a memory device to perform one or more operations described herein. In other words, the one or more data processors and the memory device of the data processing system 110 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect presentation of one or more content items to the resource server 104 or the client device 120. In addition to the processing circuit, the data processing system 110 may include one or more databases configured to store data. The content item selection system 110 may also include an interface configured to receive data via the network 101 and to provide data from the data processing system 110 to any of the other devices on the network 101. The data processing system 110 can include a server, such as an advertisement server or otherwise.

The client device 120 can include one or more devices such as a computer, laptop, desktop, smart phone, tablet, personal digital assistant, set-top box for a television set, a smart television, or server device configured to communicate with other devices via the network 101. The device may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 120 can execute a software application (e.g., a web browser or other application) to retrieve content from other computing devices over the network 101. Such an application may be configured to retrieve first-party content from a resource server 104. An application running on the client device 120 may itself be first-party content (e.g., a game, a media player, etc.). The client device 120 can execute a web browser application that provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device 120 executing the instructions from the web browser application may request data from another device connected to the network 101 referred to by the URL address (e.g., a resource server 104). The other device may then provide web page data, geographic map data, or other data to the client device 120, which causes visual indicia to be displayed by the display of the client device 120. Accordingly, the browser window displays the retrieved first-party content, such as web pages from various websites, to facilitate user interaction with the first-party content.

The resource server 104 can include a computing device, such as a server, configured to host a resource, such as a web page or other resource (e.g., articles, comment threads, music, video, graphics, search results, information feeds, geographic map data, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 120 can access the resource server 104 via the network 101 to request data to effect presentation of a resource of the resource server 104.

One or more third-party content providers may have third-party content servers 102 to directly or indirectly provide data for third-party content items to the data processing system 110 or to other computing devices via network 101. The content items may be in any format that may be presented on a display of a client device 120, for example, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the data processing system 110 or the data for the third-party content items may be stored in a database of the data processing system 110.

In one implementation, the data processing system 110 can receive, via the network 101, a request for a content item to present with a resource. The request may be received from a resource server 104, a client device 120, or any other computing device. The resource server 104 may be owned or ran by a first-party content provider that may include instructions for the data processing system 110 to provide third-party content items with one or more resources of the first-party content provider on the resource server 104. In one implementation, the resource may include a web page, or geographic map data. The client device 120 may be a computing device operated by a user (represented by an anonymous device identifier), which, when accessing a resource of the resource server 104, can make a request to the data processing system 110 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the data processing system 110 receives can include a HyperText Transfer Protocol (HTTP) cookie that contains a device identifier (e.g., a random or pseudo random number) that represents the client device 120. The device information or the resource information may be appended to a content item request URL (e.g., contentitem.item/page/contentitem?devid=abc123&devnfo=A34r0). The device information or the resource information may be encoded prior to being appended the content item request URL. The requesting device information or the resource information may be utilized by the data processing system 110 to select third-party content items to be served with the requested resource and presented on a display of a client device 120.

A resource of a resource server 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client device 120. The search results may include web page titles, hyperlinks, etc. One or more third-party content items may also be presented with the search results in a content item slot of the search result web page. Accordingly, the resource server 104 or the client device 120 may request one or more content items from the data processing system 110 to be presented in the content item slot of the search result web page. The content item request may include additional information, such as the user device information, the resource information, a quantity of content items, a format for the content items, the search query string, keywords of the search query string, information related to the query (e.g., geographic location information or temporal information), etc. In some implementations, the resource server(s) 104 (or the data processing system 110) can make a delineation between the search results and the third-party content items to avert confusion.

The third-party content server(s) 102 can manage the selection and serving of content items by the data processing system 110. For example, the third-party content server(s) 102 may set bid values or selection criteria via a user interface that may include one or more content item conditions or constraints regarding the serving of content items. A third-party content server 102 can specify that a content item or a set of content items are to be selected and served for user devices 120 having device identifiers associated with a certain geographic location or region, a certain language, a certain operating system, a certain web browser, etc. In another implementation, the third-party content provider can specify that a content item or set of content items are to be selected and served when the resource, such as a web page, document, etc., contains content that matches or is related to certain keywords, phrases, etc. The third-party content server 102 can set a single bid value for several content items, set bid values for subsets of content items, or set bid values for each content item. The third-party content provider may also set the types of bid values, such as bids based on whether a user clicks on the third-party content item, whether a user performs a specific action based on the presentation of the third-party content item, whether the third-party content item is selected and served, or other types of bids.

Figure 2:
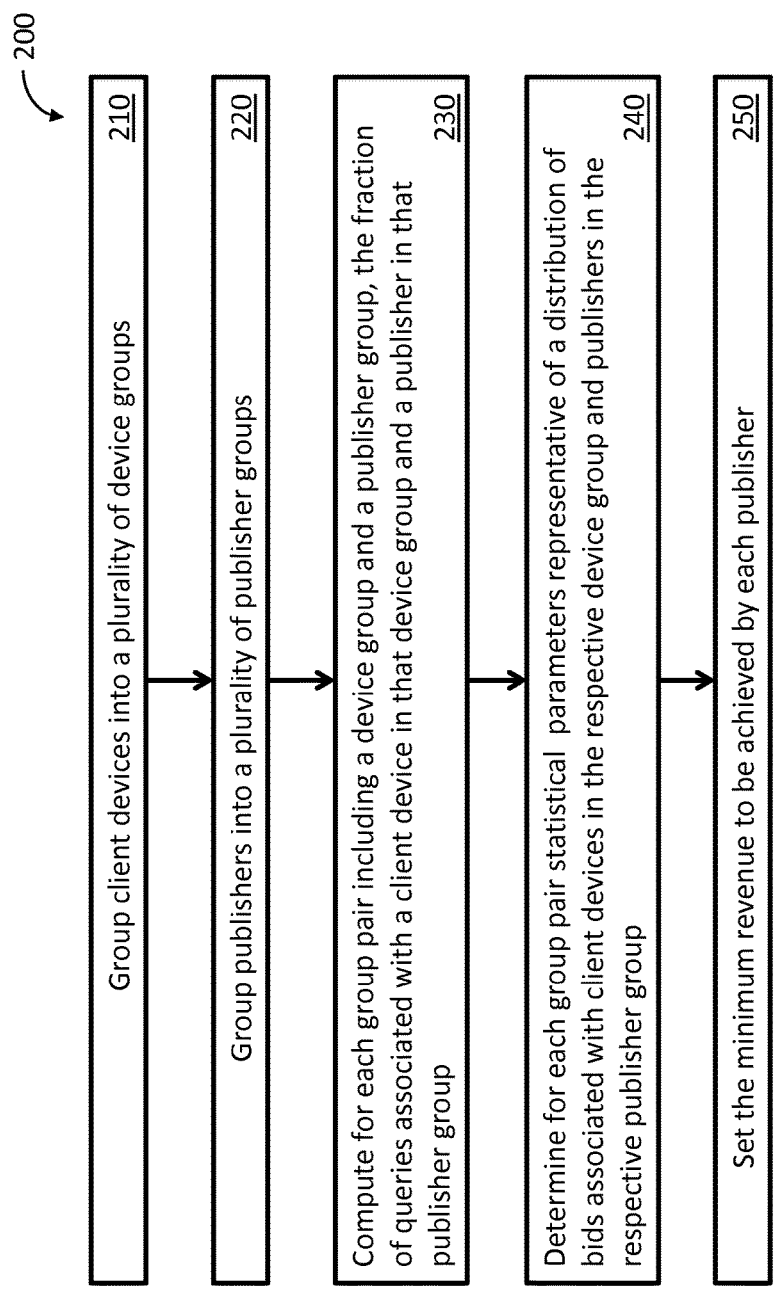
FIG. 2 shows a flowchart illustrating a method of generating statistical parameters for use to determine one or more selection criterion thresholds.

FIG. 2 shows a flowchart illustrating a method 200 of generating statistical parameters for use to determine selection criterion threshold(s). The method 200 includes grouping client devices into a plurality of device groups (ACT 210), grouping publishers into a plurality of publisher groups (ACT 220), computing for each group pair including a device group and a publisher group the fraction of queries (for third-party content items) associated with a client device in that device group and a publisher in that publisher group (ACT 230), determining for each device group and each publisher group statistical parameters representative of a probability distribution of bids (or effective cost per Mille (eCPM)) associated with that device group and that publisher group (ACT 240), and setting the minimum revenue to be achieved for each publisher (ACT 250).

The method 200 includes the data processing system 110 (or a processor coupled thereto) grouping client devices into a plurality of device groups (ACT 210). The data processing system 110 can group client devices into device groups based on one or more criteria such as common characteristics, interests, social traits or cultural traits associated with a client device, whether or not a client device selected to receive context-based third-party content, or a combination thereof. The data processing system 110 can form the device groups so that client devices associated with similar characteristics are grouped into the same device group. In some implementations, the data processing system 110 can assign different weights (or different levels of importance) to different characteristics or criteria when forming device groups. In some implementations, the data processing system 110 can be configured to form device groups such that in any device group, all respective client devices have made the same decision regarding whether or not to receive context-based third-party content. A device group can include a single client device or a plurality of client devices. In the following, the device groups are denoted as $U_i$, $i=1, \ldots, n$, where i represents an integer index and n is an integer larger than or equal to 1 indicative of the total number of device groups.

The method 200 includes the data processing system 110 (or a processor coupled thereto) grouping publishers into publisher groups (ACT 220). The data processing system 110 can form the publisher groups based on one or more criteria such as a type of a publisher domain (for instance, website, social media, mobile application or gaming platform), type or context of content published by each publisher, performance of publisher's domain (for instance, in terms of respective number of subscribers or number of user visits), characteristics associated with respective users, or a combination thereof. The data processing system 110 can be configured to group publishers with similar characteristics in the same publisher group. In determining similarities between publishers, the data processing system 110 can assign different weights (or importance levels) to distinct criteria. A publisher group can include a single publisher or multiple publishers. In the following, the publisher groups are denoted as $P_j$, j=1, ..., m, where j represents an integer index and m is an integer larger than or equal to 1 indicative of the total number of publisher groups.

The method 200 includes computing for each ($U_i$, $P_j$) pair the fraction of queries (among all queries) associated with a client device in the device group $U_i$ and a publisher in the publisher group $P_j$ (ACT 230). For instance, the data processing system 110 can compute the number of queries associated with client devices in the device group $U_i$ and publishers in the publisher group $P_j$ and divide the computed number by the total number of queries considered (such as the total number of queries used to generate the statistical parameters). In the following, the fraction of queries associated with the pair ($U_i$, $P_j$) is denoted as $\pi_{i,j}$. The value $\pi_{i,j}$ can be viewed as representing the probability of a query being associated with a client device in device group $U_i$ and a publisher in the publisher group $P_j$.

The method 200 includes the data processing system 110 (or a processor coupled thereto) determining for each ($U_i$, $P_j$) pair a representation of a probability distribution of bids (or effective cost per Mille (eCPM)) associated with client devices in the device group $U_i$ and publishers in the publisher group $P_j$ (ACT 240). The data processing system 110 can compute a representation (such as samples) of a cumulative distribution function $F_{i,j}(.)$ for each ($U_i$, $P_j$) pair. In some implementations, the data processing system 110 can compute the representation of the cumulative distribution function $F_{i,j}(.)$ based on bids placed by third-party content providers in auctions for providing third-party content for display on client devices in the device group $U_i$ and publishers in the publisher group $P_j$. In some implementations, the cumulative distribution function $F_{i,j}(.)$ represents probabilities for bid values associated with client devices in the device group $U_i$ and publishers in the publisher group $P_j$. For instance, the probability value $F_{i,j}(x)$ represents the probability that the value of a bid in an auction for providing a third-party content item to a client device in the device group $U_i$ and a publisher in the publisher group $P_j$ is less than or equal to x. In some implementations, the data processing system 110 can compute the probability value $F_{i,j}(x)$ by computing the fraction of bids (among all bids associated with the pair ($U_i$, $P_j$)) with respective bid values less than or equal to x.

The data processing system 110 can also compute a representation of a probability density function $f_{i,j}(.)$ for each pair ($U_i$, $P_j$) representing the probability density values for bid values associated with client devices in the device group $U_i$ and publishers in the publisher group $P_j$. The probability density function $f_{i,j}(.)$ is equal to the derivative of the respective cumulative distribution function $F_{i,j}(.)$. In some implementations, the data processing system 110 can compute the representation of each probability density function $f_{i,j}(.)$ by computing the derivative of the respective cumulative distribution function $F_{i,j}(.)$. In some implementations, the data processing system 110 can compute a probability density value $f_{i,j}(x)$ as the fraction of bids (among all bids associated with the pair ($U_i$, $P_j$)) with respective bid values falling between x−Δ and x+Δ, where the number 2Δ represents a sampling step. In such implementations, the computed representation of $f_{i,j}(.)$ can be viewed as a histogram with respective bins with a bin width equal to 2Δ. In some implementations, the statistical parameters can include first order statistics (such as the mean), second order statistics (such as variation or standard deviation) or higher order statistics of the bids associated with the group pair ($U_i$, $P_j$).

The method 200 also includes the data processing system 110 (or a processor coupled thereto) setting the minimum publisher revenue to be achieved for each publisher (ACT 250). The data processing system 110 can be configured to set the minimum publisher revenues for respective publishers only if the data processing system 110 is to apply a constraint (in auctions for providing third-party content items for display on client devices selecting to receive context-based third-party content) enforcing such minimum publisher revenues for the respective publishers. In some implementations, the data processing system 110 can set the minimum publisher revenues based on agreements with respective publishers, ratings (or rankings) associated with the publishers, performance of third-party content items displayed with content associated with each publisher, a global minimum revenue value, or a combination thereof. The minimum publisher revenue values can vary from one publisher to another or can be the same for all publishers. In some implementations, the minimum publisher revenues can be the same for all publishers in the same publisher group. That is, the minimum publisher revenues can vary from one publisher group to another but publishers in each group can be assigned the same minimum publisher revenue value.

The statistical parameters (such as $\pi_{i,j}$, $F_{i,j}(.)$ and $f_{i,j}(.)$) can be employed to construct an auction mechanism that can maximize economic efficiency and revenue for third-party content providers and publishers, respectively, while reducing the amount of third-party content provided for display on client devices that have selected to receive context-based third-party content. For instance, the data processing system 110 can maximize a weighted average of economic efficiency (for third-party content providers) and revenue (for publishers) subject to the constraint that any client device that have selected to receive context-based third-party content is not to be provided with third-party content items in some fraction of respective visits to publisher domains (such as websites, social media, computer applications or electronic games). The data processing system 110 can further enforce the constraint that each publisher achieves a revenue greater than or equal to a respective minimum publisher revenue.

In constructing the auction mechanism, the data processing system 110 can compute a reserve price $r_{u,p}$ (or more generally a selection criterion threshold value) for each client device-publisher pair (u, p) such that, the computed reserve prices $r_{u,p}$ (for all client device-publisher pairs (u, p)), when used in the auction mechanism, result in maximizing the weighted average of economic efficiency (for third-party content providers) and revenue (for publishers) subject to the constraints of enforcing a reduction in the amount of third-party content provided for display on client devices selecting to receive context-based third party content and enforcing a minimum publisher revenue for each respective publisher. That is, the data processing system 110 can achieve the goals of (1) reducing the amount of third-party content provided for display on client devices that have selected to receive context-based third-party content, (2) maximizing a weighted average of publisher revenue and economic efficiency for third-party content providers, and (3) enforcing a minimum publisher revenue for each publisher by determining and using (in auctions) the proper reserve price $r_{u,p}$ for each client device-publisher pair (u, p). Accordingly, the data processing system 110 can accommodate such goals (or constraints) within the auction mechanism without substantial change or substantial increase in the complexity of the online operations of the auction mechanism. It is to be appreciated that the reserve prices can be monetary prices or more generally selection criterion thresholds that are used to select a bidder (for providing a third-party content item) from multiple bidders. For instance, a selection criterion can be an auction score indicative of a bid value, measure of content similarity between a third-party content item and content associated with the publisher, measure of third-party content relevance, measure of likelihood of a third-party content item triggering an action by the client device or a combination thereof.

Since the statistical parameters $\pi_{i,j}$, $F_{i,j}(.)$ and $f_{i,j}(.)$ are shared by all client device-publisher pairs (u, p) where the client device u is in the device group $U_i$ and the publisher p is in the publisher group $P_j$, all client device-publisher pairs associated with the device group $U_i$ and the publisher group $P_j$ can have the same reserve price (denoted as $r_{i,j}$). That is, a single reserve price $r_{i,j}$ can be used for all client-device publisher pairs with the respective client device being in the device group $U_i$ and the respective publisher being in the publisher group $P_j$. In some implementations, a third-party content provider winning an auction (having the highest bid) can pay an amount equal to the second highest price (or second highest bid value) or, more generally, can pay a price smaller than the highest bid but larger than or equal to the second highest price. The average (or cumulative) economic efficiency for third-party content providers can be formulated as:

$$E = \Sigma_{i,j} \pi_{i,j} [n_{i,j} \int_{r_{i,j}}^{\infty} v f_{i,j}(v) F_{i,j}(v)^{n_{i,j}-1} dv] \quad (1)$$

where $n_{i,j}$ represents the number of third-party content providers competing in an auction involving a client device from device group $U_i$ and a publisher in a publisher group $P_j$. Since the number of third-party content providers competing in an auction can be dynamically varying from one auction to another, $n_{i,j}$ can represent the average number of third-party content providers competing in an auction involving a client device from device group $U_i$ and a publisher in a publisher group $P_j$. The average (or cumulative) revenue for publishers can be described as:

$$R = \sum_{i,j} \pi_{i,j} \left[ n_{i,j} \int_{r_{i,j}}^{\infty} \left( v - \frac{1 - F_{i,j}(v)}{f_{i,j}(v)} \right) f_{i,j}(v) F_{i,j}(v)^{n_{i,j}-1} dv \right]. \quad (2)$$

The weighted average of economic efficiency (for third-party content providers) and revenue (for publishers) can be obtained by multiplying the publisher revenue by a number $\lambda$ (a value between 0 and 1) and multiplying the economic efficiency by $(1-\lambda)$ to obtain:

$$W = \lambda \times R + (1 - \lambda) \times E = \quad (3)$$
$$\sum_{i,j} \pi_{i,j} \left[ n_{i,j} \int_{r_{i,j}}^{\infty} \left( v - \lambda \frac{1 - F_{i,j}(v)}{f_{i,j}(v)} \right) f_{i,j}(v) F_{i,j}(v)^{n_{i,j}-1} dv \right].$$

The constraint of enforcing a reduction in the number of third-party content items provided for display by client devices selecting to receive context-based third-party content can be formulated as:

$$\Sigma_j \pi_{i,j} F_{i,j}(r_{i,j})^{n_{i,j}} \geq \alpha \pi_i \quad (4),$$

where $\pi_i$ represents the fraction of queries associates with any client device in the device group $U_i$. The parameter $\alpha$ can be a constant between 0 and 1 representing a fraction of visits to publisher domains, by a client device receiving context-based third-party content, during which no third-party content is provided for display on that client device. The constraint for enforcing a minimum publisher revenue for each publisher in a publisher group $P_j$ can be formulated as:

$$\sum_i \pi_{i,j} \left[ n_{i,j} \int_{r_{i,j}}^{\infty} \left( v - \frac{1 - F_{i,j}(v)}{f_{i,j}(v)} \right) f_{i,j}(v) F_{i,j}(v)^{n_{i,j}-1} dv \right] \geq R_j, \quad (5)$$

where $R_j$ represents the minimum publisher revenue to be achieved for each publisher in the publisher group $P_j$. The weighted average W (or more generally the objective function W) described by equation (3) and the constraints in equations (4) and (5) can be formulated in many other ways. For instance, the objective function W in equation (3) can be defined further in terms of other factors such as a measure of contextual similarity between third-party content items and content associated with publishers or a measure of relevance of third-party content items to users of the publisher domains. Also, equation (4) can be formulated to in a way that the number of third-party content items provided for client devices selecting to receive (or receiving) context-based third-party content is upper-bounded by a constant number. Also, the minimum publisher revenue in equation (5) can be defined as a function of the performance of the publisher domains (for instance, $R_j = R_j(y)$, where y is a measure of the performance of publisher domains for publishers in the publisher group $P_j$).

An optimization problem for determining the reserve prices $r_{i,j}$ can be described as $\max_{r_{i,j}} W$ subject to the constraints in equations (4) and (5). Such optimization problem can be solved using the Lagrangian described as $$L = W - \sum_i \lambda_i \left( \alpha \pi_i - \sum_j \pi_{i,j} F_{i,j}(r_{i,j})^{n_{i,j}} \right) - \sum_j \lambda_j \left( R_j - \sum_i \pi_{i,j} \left[ n_{i,j} \int_{r_{i,j}}^{\infty} \left( v - \frac{1 - F_{i,j}(v)}{f_{i,j}(v)} \right) f_{i,j}(v) F_{i,j}(v)^{n_{i,j}-1} dv \right] \right), \quad (6)$$

where $\lambda_i$ and $\lambda_j$ represent Lagrangian multipliers. The solution for the optimization problem can be found by equating the derivative of L with respect to the reserve prices $r_{i,j}$ to zero and solving the resulting equation to find the reserve prices $r_{i,j}$. Equating the derivative of L with respect to the reserve prices $r_{i,j}$ to zero leads to the equality $$\frac{r_{i,j} - \lambda \frac{1 - F_{i,j}(r_{i,j})}{f_{i,j}(r_{i,j})} - \lambda_i}{r_{i,j} \frac{1 - F_{i,j}(r_{i,j})}{f_{i,j}(r_{i,j})}} = -\lambda_j. \quad (7)$$

That is, for a given publisher in the publisher group $P_j$, the left side in equation (7) above is equal to the value $-\lambda_j$ for all client devices regardless of their user group(s). Given the complexity of equation (7), the data processing system 110 (or a processor coupled thereto can solve for the reserve prices $r_{i,j}$ by employing an iterative process.

Figure 3:
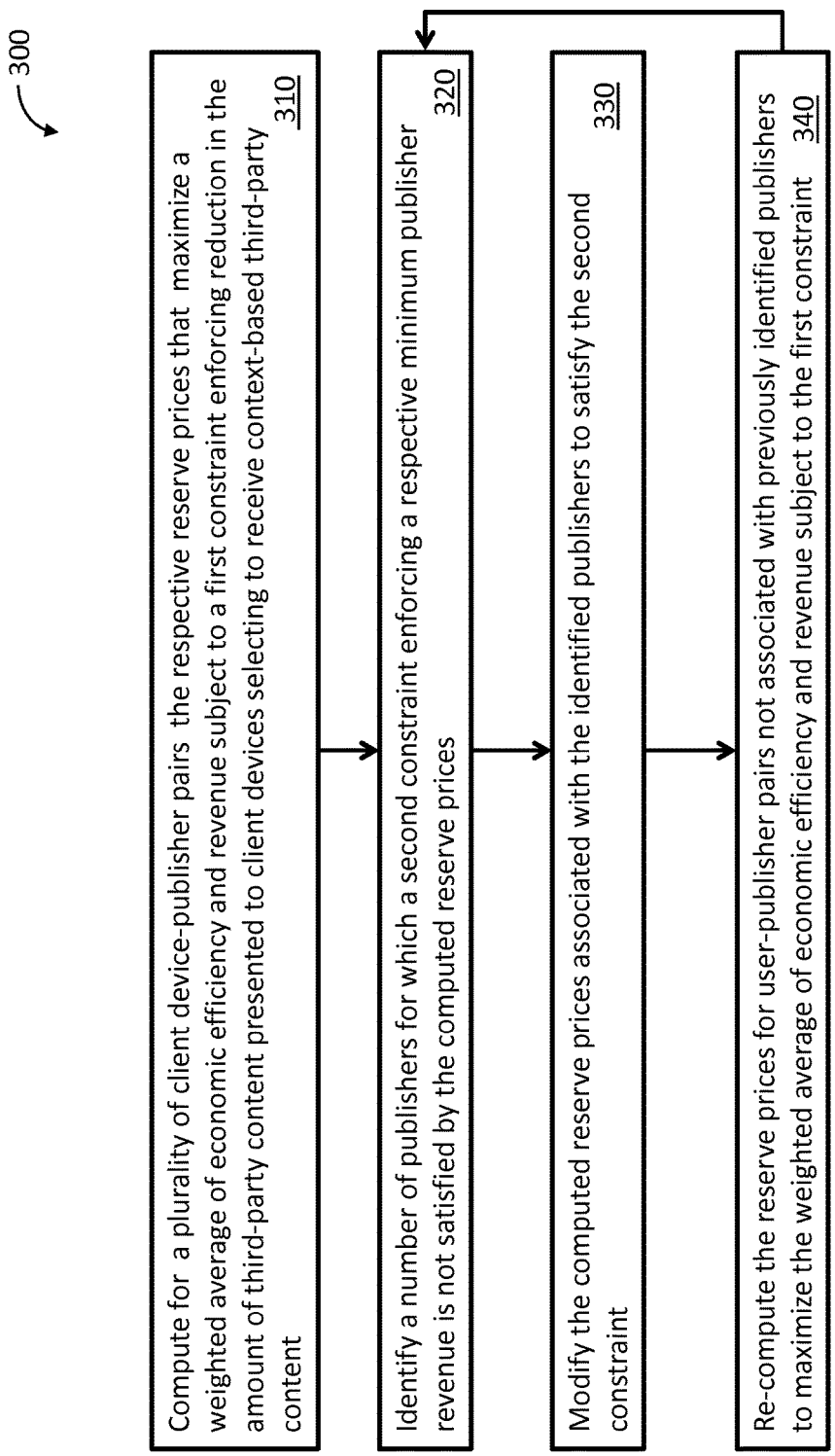
FIG. 3 shows a flowchart illustrating a method of computing reserve prices for use in auctions in association with client devices selecting to receive context-based third-party content.

FIG. 3 shows a flowchart illustrating a method 300 of computing reserve prices for use in auctions in association with client devices selecting to receive (or receiving) context-based third-party content. The method 300 includes computing for a plurality of client device-publisher pairs the respective reserve prices that would maximize the weighted average of economic efficiency and revenue subject to a first constraint enforcing reduction in the amount of third-party content provided for display on a client device selecting to receive context-based third-party content (ACT 310), identifying a number of publishers for which a second constraint enforcing a respective minimum publisher revenue is not satisfied by the computed reserve prices (ACT 320), modifying the computed reserve prices associated with the identified publishers to satisfy the second constraint (ACT 330), re-computing the reserve prices for the client device-publisher pairs not associated with previously identified publishers to maximize the weighted average of economic efficiency and revenue subject to the first constraint (ACT 340), and repeating the steps of modifying and re-computing the reserve prices until all reserve prices satisfy both the first and the second constraints.

The method 300 includes the data processing system 110 (or a processor coupled thereto) computing for a plurality of client device-publisher pairs the respective reserve prices that would maximize the weighted average of economic efficiency and revenue subject to a first constraint enforcing reduction in the amount of third-party content presented to each client device that have selected to receive context-based third-party content (ACT 310). Referring to equations (6) and (7), omitting the second constraint (described in equation (5)) and considering only the first constraint (described in equation (4)) when solving for the reserve prices $r_{i,j}$ is equivalent to setting $\lambda_j = 0$. In such cases, equation (7) can be simplified to $$r_{i,j} - \lambda \frac{1 - F_{i,j}(v)}{f_{i,j}(v)} = \lambda_i. \quad (8)$$

The reserve prices computed (or to be computed) in ACT 310 satisfy the equality in equation (8). That is, for a given user in a respective device group $U_i$, the left-hand side of equation (8) is equal to some fixed constant $\lambda_i$ for all publishers regardless of their respective publisher group(s). For all client devices that have selected to receive context-based third-party content, the data processing system 110 can choose the constant value $\lambda_i$ such that the resulting reserve prices $r_{i,j}$ (computed based on equation (8)) satisfy the first constraint in (4) above. For instance, the data processing system can choose $\lambda_i$ to be equal to zero if that would lead to reserve prices (based on equation (8)) that satisfy equation (4). Otherwise, the data processing system can choose a value for $\lambda_i$ that is greater than zero and that would result in reserve prices (based on equation (8)) that satisfy the first constraint as described in equation (4). For client devices that have not selected to receive context-based third-party content, the value for $\lambda_i$ can be chosen to be equal to zero.

The method 300 includes the data processing system 110 identifying a number of publishers for which a second constraint enforcing a respective minimum revenue is not satisfied by the respective reserve prices (ACT 320). For instance, the data processing system 110 can evaluate (using the reserve prices computed in ACT 310) whether the inequality in equation (5) is satisfied for each publisher group $P_j$ (or for each publisher). Based on such evaluation(s), the data processing system 110 can determine the publishers (or the groups of publishers) for which the constraint described in equation (5) is not satisfied. The data processing system 110 can then modify the reserve prices for the client device-publisher pairs associated with the identified publishers so that the modified reserve prices satisfy the second constraint in equation (5) (ACT 330). For such client device-publisher pairs, the data processing system 110 can modify the respective reserve prices to satisfy the condition in equation (7) for the values of $\lambda_i$ computed in ACT 310. The data processing system 110 can choose the constant $\lambda_j$ so that the respective modified reserve prices satisfy equation (7) and the second constraint in equation (5) (for instance with equality at equation (5)). While the modifications performed in ACT 330 results in having the modified reserve prices associated with the identified publishers satisfy the second constraint (to enforce minimum publisher revenue), the same modifications may result in making other reserve prices (not associated with the identified publishers) fail to satisfy the first constraint (such as described in equation (4)).

The method 300 includes re-computing the reserve prices for the client device-publisher pairs not associated with publisher(s) identified at ACT 320 by maximizing the weighted average of economic efficiency and revenue subject to the first constraint (ACT 340). The data processing system 110 can hold the reserve prices modified in ACT 330 fixed and re-compute the reserve prices for client device-publisher pairs not associated with publishers identified at ACT 320 by maximizing W (in equation (3)) subject to the first constraint described in equation (4). The data processing system 110 can re-compute the reserve prices $r_{i,j}$ based on equation (8). The data processing system 110 can determine the value of $\lambda_i$ that would result in reserve prices that satisfy the first constraint in equation (4).

The data processing system 110 (or a processor coupled thereto) can then loop back to ACT 320 to identify a number of publishers, if any, for which the second constraint is not satisfied. If one or more publishers are identified, the data processing system 110 can proceed to ACT 330 to modify reserve prices associated with the identified publishers and then proceed to ACT 340 to re-compute the reserve prices (for publishers not identified at ACT 320) to satisfy the first constraint. The data processing system 110 can keep looping through ACTs 320-340 until the first constraint is satisfied for all client devices and the second constraint is satisfied for all publishers. In such case, the data processing system 110 can use the computed reserve prices in auctions to select third-party content items for presenting to client devices with publishers' content. The final computed reserve prices, when used by the data processing system 110 in the auctions, would guarantee a reduction in the number of content items presented to each client device that have selected to receive context-based third-party content. In some implementations, the data processing system 110 can perform the methods 200 and 300 offline to compute the reserve prices and then use the computed reserve prices in online auctions to select third-party content for display to client devices.

As an illustrative example, consider a scenario with three publishers and two client devices. The publishers include a low-value publisher (publisher 1), a medium-value publisher (publisher 2), and a high-value publisher (publisher 3). The client devices include a high-value client device (client device 1), and a low-value client device (client device 2). Each client device visits any of three websites associated with the three publishers equally often and the two client devices visit the websites as often as one another. Thus, each client device-publisher pair can arise in ⅙ of all auction opportunities (or queries for third-party content) and each client device can show up in ½ of all auction opportunities. According to this scenario, each device group includes a single client device and each publisher group includes a single publisher. As such, the fraction of queries associated with each client device-publisher pair (or each ($U_i$, $P_j$) pair) is $$\pi_{i,j} = \frac{1}{6}$$

for i=1 or 2 and j=1, 2 or 3. Also, the fraction of queries associated with each client device is $$\pi_i = \frac{1}{2}$$

for i=1 or 2.

For every auction opportunity (or query) associated with any client device-publisher pair, a single third-party content provider is bidding to provide third-party content. That is, the number of third-party content providers for any query to any client device-publisher pair is $n_{i,j}=1$. Accordingly, the third-party content provider bidding in any auction will have the respective third-party content item displayed and pay a price equal to the reserve price if the third-party content provider makes a bid greater than or equal to the reserve price. The third-party content item will not be displayed if the bid is less than the reserve price.

Bids associated with the client device-publisher pair including client device 1 and publisher 1 are drawn from a uniform distribution in the interval [0, 1]. For queries associated with client device 1 and publisher 2, the respective bids have a uniform distribution on [0, 2]. For queries associated with client device 1 and publisher 3, the respective bids have a uniform distribution on [0, 10]. In queries associated with client device 2, the respective bids have a uniform distribution in the interval [0, ½], a uniform distribution on [0, 1] and a uniform distribution on [0, 5] for publisher 1, publisher 2 and publisher 3, respectively. Accordingly, the respective distribution functions can be defined as $F_{1,1}(x)=x$ and $f_{1,1}(x)=1$ for $x \in [0,1]$, $F_{1,2}(x)=x/2$ and $f_{1,2}(x)=\frac{1}{2}$ for $x \in [0,2]$, $F_{1,3}(x)=x/10$ and $f_{1,1}(x)=\frac{1}{10}$ for $x \in [0,10]$, $F_{2,1}(x)=2x$ and $f_{1,1}(x)=2$ for $x \in [0,\frac{1}{2}]$, $F_{2,2}(x)=x$ and $f_{2,2}(x)=1$ for $x \in [0,1]$, $F_{2,3}(x)=x/5$ and $f_{1,1}(x)=\frac{1}{5}$ for $x \in [0,5]$. In this example, both client devices have selected to receive context-based third-party content and as a result each client device is to experience a reduction by half in the respective number of displayed third-party content items. That is, $$\alpha = \frac{1}{2}.$$

Also, minimum revenues for publisher 1, publisher 2, and publisher 3 are set to $R_1=0.18$, $R_2=0.365$ and $R_3=0.536$.

In the following, the economic efficiency E is to be maximized (i.e., $\lambda=0$ in equation (3)) subject to the constraint that there is a reduction by at least half in the number of third party content items presented for display on each client device and the constraint that the minimum revenues $R_1=0.18$, $R_2=0.365$ and $R_3=0.536$ are satisfied for publisher 1, publisher 2 and publisher 3, respectively. In order to solve this example, the values of the six reserve prices $r_{i,j}$ (for i=1 or 2 and j=1, 2 or 3) that maximize the economic efficiency and satisfy both constraints can be determined according to the method 300.

First, the data processing system 110 can compute the reserve prices $r_{i,j}$ (for i=1 or 2 and j=1, 2 or 3) as discussed with regard to ACT 310 of FIG. 3, by setting the reserve prices to satisfy equation (8) with $\lambda=0$. As such, equation (8) reduces to $r_{i,j}=\lambda_i$, which means that for each client device, the respective reserve prices are equal to a constant regardless of the publisher. Accordingly, solving the problem of maximizing the economic efficiency subject to the first constraint described in equation (4) is reduced to finding two reserve price values for client device 1 and client device 2, respectively, that satisfy equation (4). One solution for such problem is $r_{1,1}=r_{1,2}=r_{1,3}=0.9375$ and $r_{2,1}=r_{2,2}=r_{2,3}=0.46875$.

Second, the data processing system can apply the process described with regard to ACT 320 using the reserve prices computed above according to ACT 310 to identify the publishers, if any, for which the minimum revenue constraint (as described in equation (5)) is not satisfied. As described above with regard to ACT 320 of FIG. 3, such publishers can be identified by evaluating the inequality in equation (5) for each publisher using the computed reserve prices. The only publisher for which the minimum revenue constraint (as described in equation (5)) is not satisfied is publisher 1. In fact, publisher 1 is having third-party content items shown on the respective website (or publisher domain) 6.25% of the time and, as such, publisher 1 cannot achieve the respective minimum revenue based on the computed reserve prices. The other publishers, on the other hand, can achieve the respective minimum revenues.

For publisher 1, the data processing system 110 can set the reserve prices for the two different client devices so that publisher 1 can achieve the respective minimum. The data processing system 110 can choose the reserve prices for publisher 1 to satisfy equation (7) above. Given that $\lambda=0$, equation (7) reduces to:

$$\frac{r_{i,j} - \lambda_i}{r_{ij} \frac{1 - F_{i,j}(r_{i,j})}{f_{i,j}(r_{i,j})}} = -\lambda_j. \quad (9)$$

That is, for publisher 1, the value of the left-hand side of equation (9) is equal to a constant for any client device. A solution can be achieved by setting $\lambda_1=0.9375$ and $\lambda_2=0.46875$, which leads to $r_{1,1}=0.6$ for client device 1 and $r_{2,1}=0.3$ for client device 2.

In the next step (corresponding to ACT 340 and ACT 350 in FIG. 3), the data processing system 110 can hold the modified reserve prices (as discussed above) for publisher 1 fixed and re-compute the reserve prices associated with only the remaining publishers to maximize the economic efficiency subject to the first constraint (as described in equation (4)). The result of the re-computing process is $r_{1,2}=r_{1,3}=1.5$ and $r_{2,2}=r_{2,3}=0.75$.

Given the re-computed reserve prices for publishers 2 and 3, the data processing system 110 can identify which, among these two publishers, cannot achieve the respective minimum revenue by evaluating the constraint in equation (5) for both publishers. The result shows that the second constraint as described in equation (5) is not satisfied for publisher 2. The data processing system 110 then modifies the reserve prices associated with publisher 2 based on equation (9) to satisfy the second constraint in equation (5). The data processing system 110 can achieve the reserve prices (for publisher 2) that satisfy the second constraint in equation (5) by setting $\lambda_1=1.5$ and $\lambda_2=0.75$, which leads to $r_{1,2}=1.2$ for client device 1 and $r_{2,2}=0.6$ for client device 2.

Once the reserve prices for publisher 2 are modified, the data processing system 110 can keep the reserve prices associated with publishers 1 and 2 fixed (not to be changed) and re-computes the reserve prices associated with the remaining publishers (i.e., publisher 3) by maximizing the economic efficiency subject to the first constraint in equation (4). The result of the re-computing process leads to $r_{1,3}=3$ for client device 1 and $r_{2,3}=1.5$ for client device 2. At this point, the reserve prices associated with all client device-publisher pairs satisfy both the first and second constraints as described in equations (4) and (5). Accordingly, the data processing system 110 can employ the obtained reserve prices in online auctions for processing queries associated with the different client device-publisher pairs.

In some implementations, the data processing system 110 can compute for a plurality of client device-publisher pairs the respective reserve prices that maximize the weighted average of economic efficiency and revenue W subject to a first constraint enforcing reduction in the amount of third-party content presented to each client device that has selected to receive context-based third-party content. The data processing system 110 can compute the reserve prices as described above with respect to ACT 310 of FIG. 3. That is, the data processing system 110 can solve for the reserve prices that maximize W (as described in equation (3)) subject to the constraint in equation (4). The data processing system 110 can obtain the solution based on equation (8).

Once the reserve prices are computed, the data processing system 110 can use the computed reserve prices in auctions for serving queries associated with the client device-publisher pairs. The data processing system can use the computed reserve prices as parameters of an auction mechanism. For any query associated with a respective client device-publisher, the data processing system 110 can consider only bids higher than the reserve price associated with that client device-publisher pair. If all bids are below the reserve price for the client device-publisher pair, the data processing system will not provide any third-party content for display in response to the query.

The data processing system 110 (or a processor coupled thereto) can then make payments (or assign revenue amounts) to publishers, such that the payment (or the assigned revenue amounts) satisfy minimum publisher revenues for respective publishers. The data processing system 110 can assign to each publisher a revenue amount equal to the minimum publisher revenue for that publisher. In some implementations, the data processing system 110 can assign a revenue amount for each publisher that is greater than the respective minimum revenue for that publisher. The data processing system 110 can use extra income generated by well-performing publishers (e.g., publishers generating more than their minimum revenue) to make payments to poorly-performing publishers (e.g., publishers generating less than their minimum revenue). In some implementations, the data processing system 110 can pay (or assign a revenue) to each publisher based on income generated from third-party content items presented for display with content of that publisher. That is, the data processing system 110 may not enforce minimum publisher revenues for publishers and enforce only the constraint to reduce the amount of third-party content provided to client devices selecting to receive context-based third-party content.

Figure 4:
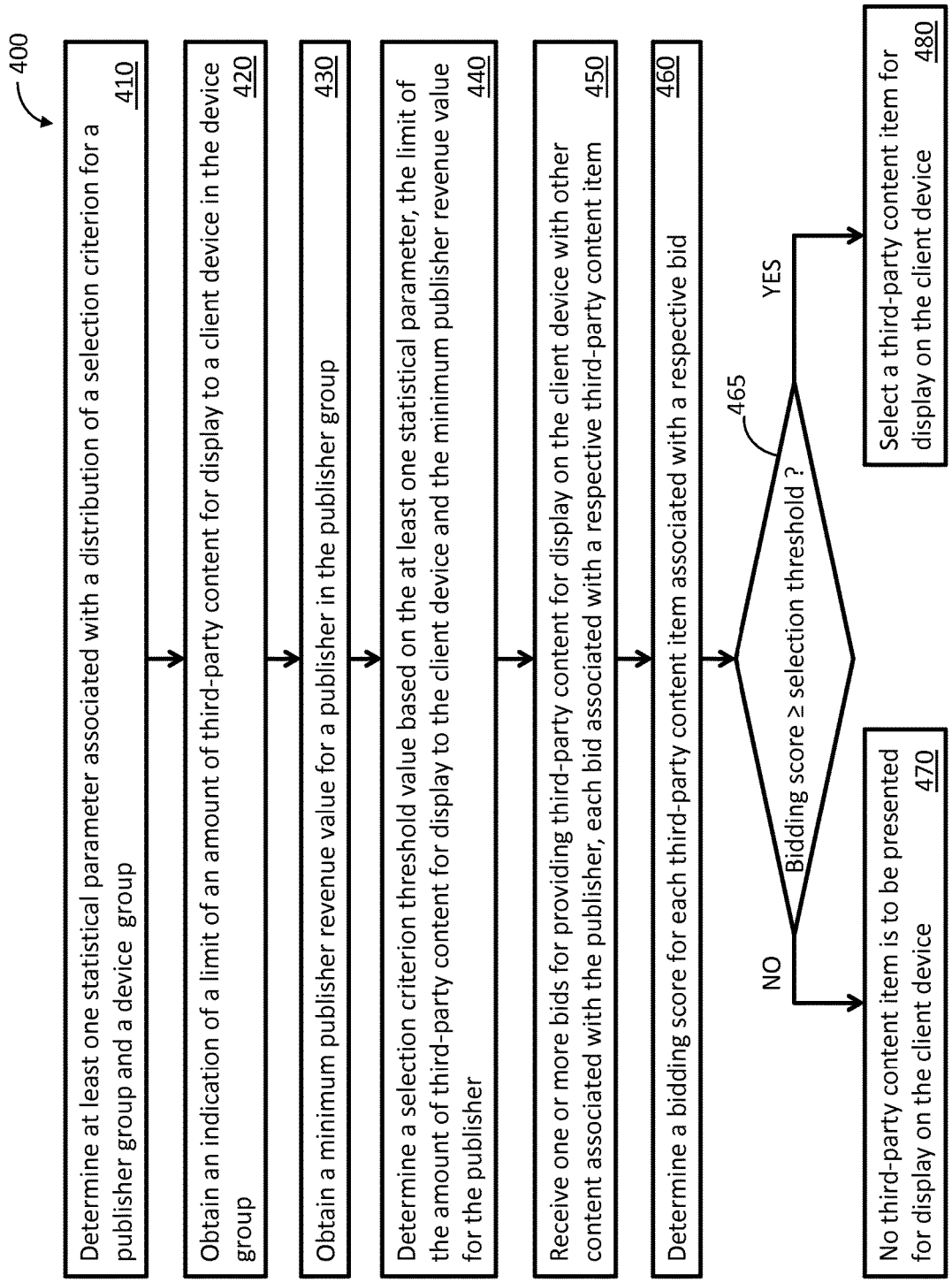
FIG. 4 shows a flowchart illustrating a method of providing context-based third-party content.

FIG. 4 shows a flowchart illustrating a method 400 of providing context-based third-party content. The method 400 includes determining at least one statistical parameter associated with a distribution of a selection criterion for a publisher group and a device group (ACT 410), obtaining an indication of a limit of an amount of third-party content for display to a client computer device in the device group (ACT 420) obtaining a minimum publisher revenue value for a publisher in the publisher group (ACT 430), determining a selection criterion threshold value based on the at least one statistical parameter, the limit of the amount of third-party content for display to the client computer device and the minimum publisher revenue value for the publisher (ACT 440), receiving one or more bids for providing third-party content for display, with other content associated with the publisher, on the client device such that each bid is associated with a respective third-party content item (ACT 450), determining a bidding score for each third-party content item associated with a respective bid (ACT 460), upon determining that all bidding scores are below the selection criterion threshold value (ACT 465), providing none of the third-party content items for display to the client device (ACT 470) and upon determining that at least one bidding score is larger than or equal to the selection criterion threshold value (ACT 465), selecting a third-party content item with a respective bidding exceeding or equal to the selection criterion threshold value for display on the client device (ACT 480).

The method 400 includes the data processing system 110 (or a processor coupled thereto) determining at least one statistical parameter associated with a distribution of a selection criterion for a publisher group and a device group (ACT 410). The data processing system 110 can collect historical data (such as previous bid values or previous auction score values) associated with the selection criterion and compute statistical parameter(s) indicative of a distribution of the selection criterion for the group pair including the device group and the publisher group. As described above with regard to FIG. 2, the statistical parameter(s) can include a representation of a cumulative distribution function, representation of a probability density function, fraction of queries associated with the device group and the device group (such as $\pi_{i,j}$), mean value, variance or standard deviation value, other higher-order statistics or a combination thereof.

The method 400 includes the data processing system 110 (or a processor coupled thereto) obtaining an indication of a limit of an amount of third-party content for display to a client device in the device group (ACT 420) and obtaining a minimum publisher revenue value for a publisher in the publisher group (ACT 430). The limit can be a value of $\alpha$ as used in equation (4) or a constant upper-bound for the amount of third-party content for display to a client computer device in the device group. Obtaining the indication of the limit can include retrieving a value of the limit from a memory or computing a limit value based on one or more parameters. The data processing system 110 can retrieve a value of the minimum publisher revenue from memory or compute such value based on one or more parameters.

The method 400 includes the data processing system 110 (or a processor coupled thereto) determining a selection criterion threshold value based on the at least one statistical parameter, the limit of the amount of third-party content for display to the client device and the minimum publisher revenue value for the publisher (ACT 440). As discussed with regard to equations (1) through (7) and with regard to FIG. 3, the data processing system 110 can use an optimization problem formulation with a first constraint enforcing the limit (obtained at ACT 420) on the amount of third-party content to be provided for display to a client device in the device group and a second constraint enforcing the minimum publisher revenue for publisher in the publisher groups to determine (or compute) the selection criterion threshold. In some implementations, the data processing system 110 can employ optimization tools known in the art to solve the formulated optimization problem for the selection criterion threshold. The selection criterion threshold can include a minimum bid value, a minimum auction score, or a threshold for any other selection criterion used to select third-party content for display on client devices.

The method 400 includes the data processing system 110 (or a processor coupled thereto) receiving one or more bids for providing third-party content for display, with other content associated with the publisher, on the client device such that each bid associated with a respective third-party content item (ACT 450). The data processing system 110 can determine the selection criterion threshold offline. Once the selection criterion threshold is determined, the data processing system 110 can use it in auctions to provide third-party content, with content associated with the publisher, to the client device. In an auction associated with the client device and the publisher, the data processing system can receive bids from one or more third-party content providers. Each provider can bid to have a respective third-party content item presented to the client device with content associated with the publisher.

The data processing system can determine a bidding score for each third-party content item associated with a respective bid (ACT 460). When bidding, each third-party content item provides a bid value (for instance, to be paid if respective third-party content item is selected). The data processing system can determine a bidding score for each third-party content item based on the respective bid value, content of the third-party content item, type of the third-party content item (such as image, video or audio), previous performance of the third-party content item or a combination thereof.

Upon determining that all bidding scores are below the selection criterion threshold value (ACT 465), the data processing system does not provide any of the third-party content items for display to the client device (ACT 470). The data processing system 110 can compare the bidding scores to the selection criterion threshold and eliminate the third-party content items associated with bidding scores below the threshold value from being considered for display on the client device. If all third-party content items are eliminated, the data processing does not provide third-party content for display, with the publisher content, to the client devices. In such case, only the publisher content is displayed on the client device. Slots reserved for third-party content may be shown as blank when displaying the publisher content.

Upon determining that at least one bidding score is larger than or equal to the selection criterion threshold value (ACT 455), the data processing system 110 can select a third-party content item with a respective bidding score exceeding or equal to the selection criterion threshold value for display on the client device (ACT 480). The data processing system 110 can select the third-party content item with the highest bidding score for display on the client device with the publisher's content. The winning bidder can be charged an amount smaller than the respective bid value (or bidding amount). In some implementations, the data processing system 110 can charge the winning bidder the second highest bidding amount.

While the methods and systems described above in this specification are described in terms of reserve prices, such methods are applicable for general selection criteria thresholds. That is, given a selection criterion for selecting third-party content items in auctions to present to client devices, a processor can determine respective thresholds (for the selection criterion) that maximize a gain (or objective) subject to at least a constraint that enforces reduction in the amount of third-party content presented to client devices selecting to receive context-based third-party content. The maximization (or minimization) of the objective can be subject to other constraints (such as minimum revenue for publishers). The objective can be defined in different ways (e.g., a weighted average of economic efficiency and revenue, average revenue for publishers or average economic efficiency).

Figure 5:
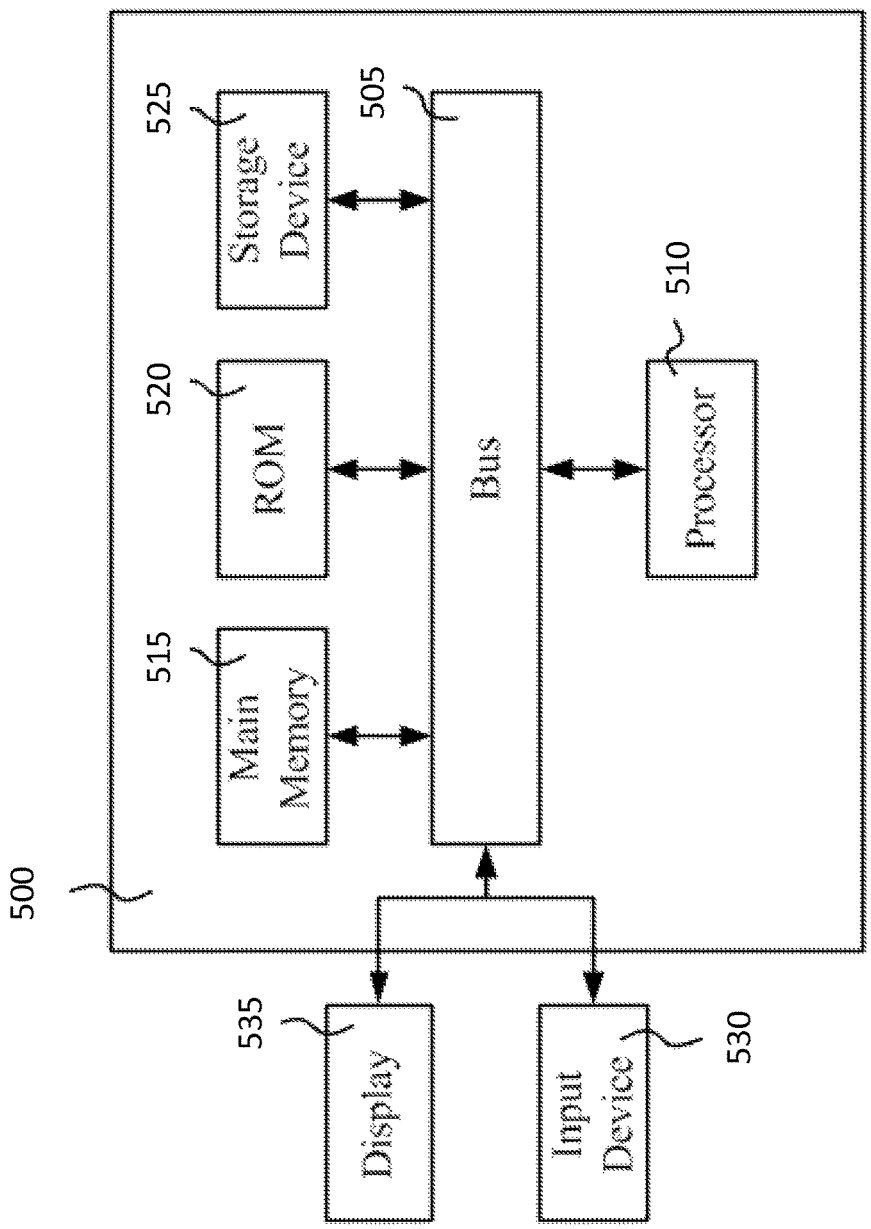
FIG. 5 is a block diagram depicting one implementation of a general architecture for a computer system that may be employed to implement various elements of the systems and methods described and illustrated herein.

FIG. 5 is a block diagram of a computer system 500 that can be used to implement the client device 120, data processing system 110, third-party content server 102, resource server 104, and other components described herein. The computing system 500 includes a bus 505 or other communication component for communicating information and a processor 510 coupled to the bus 505 for processing information. The computing system 500 can also include one or more processors 510 coupled to the bus for processing information. The computing system 500 also includes main memory 515, such as a RAM or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a ROM 520 or other static storage device coupled to the bus 505 for storing static information and instructions for the processor 510. A storage device 525, such as a solid state device, magnetic disk or optical disk, is coupled to the bus 505 for persistently storing information and instructions. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 500 may be coupled via the bus 505 to a display 535, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 530, such as a keyboard including alphanumeric and other keys, may be coupled to the bus 505 for communicating information and command selections to the processor 510. In another implementation, the input device 530 may be integrated with the display 535, such as in a touch screen display. The input device 530 can include a cursor control, such as a mouse, a trackball, or cursor direction keys, for communicating direction information and command selections to the processor 510 and for controlling cursor movement on the display 535.

According to various implementations, the processes or methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes or method ACTs described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an implementation of a computing system 500 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A method of providing third-party content, comprising:
   determining, by a data processing system including at least one processor, at least one statistical parameter indicative of a joint probability distribution of a selection score among a plurality of publisher groups and a plurality of device groups, each publisher group of the plurality of publisher groups including one or more respective publishers and each device group of the plurality of device groups including one or more respective client computer devices that have selected to receive context-based third-party content, for each group pair including a device group of the plurality of device groups and a publisher group of the plurality of device groups, the joint probability distribution indicative of a probability of the selection score being associated with devices of the device group in the group pair and publishers of the publisher group in the group pair;
   obtaining, by the data processing system, an indication of a predetermined threshold amount of third-party content for display to a client computer device in a first device group of the plurality of device groups;
   obtaining, by the data processing system, a predetermined threshold publisher revenue value for a publisher in a first publisher group of the plurality of publisher groups;
   determining, by the data processing system, a selection score threshold of the selection score specific to a group pair including the first device group and the first publisher group based on the at least one statistical parameter indicative of the joint probability distribution of the selection score, the predetermined threshold amount of third-party content for display to the client computer device, and the predetermined threshold publisher revenue value for the publisher;
   receiving, by the data processing system, one or more bids for providing third-party content for display on the client computer device with content associated with the publisher, each bid associated with a respective third-party content item;
   determining, by the data processing system, a bidding score for each third-party content item associated with a respective bid;
   determining, by the data processing system, that at least one of the one or more bidding scores exceeds or is equal to the selection score threshold; and
   selecting, by the data processing system, a third-party content item associated with a bidding score exceeding or equal to the selection score threshold as a candidate for display to the client computer device with the content associated with the publisher.

2. The method of claim 1, wherein the one or more bids include one or more first bids associated with a first auction, the one or more third-party content items include one or more first third-party content items and the one or more bidding scores include one or more first bidding scores, the method comprising:
   receiving, by the data processing system, one or more second bids associated with a second auction, for providing other third-party content for display on the client computer device with other content associated with the publisher, each second bid associated with a respective second third-party content item;
   determining, by the data processing system, a second bidding score for each second third-party content item;
   determining, by the data processing system, that none of the one or more second bidding scores exceeds or is equal to the selection score threshold; and
   providing, by the data processing system, none of the one or more second content items for display on the client computer device with the other content associated with the publisher.

3. The method of claim 1, wherein the selection score threshold includes a minimum bid value for each client device-publisher pair with a respective client device in the first device group and a respective publisher in the first publisher group.

4. The method of claim 1, comprising:
   obtaining, by the data processing system, for each device group of the plurality of device groups, an indication of a corresponding predetermined threshold amount of third-party content for display to client computer devices in that device group;
   obtaining, by the data processing system, for each publisher group of the plurality of publisher groups, a corresponding predetermined threshold publisher revenue value for publishers in that publisher group; and
   determining, for each group pair including a respective device group and a respective publisher group, a corresponding selection score threshold for client device-publisher pairs associated with the group pair based on the at least one statistical parameter, the corresponding predetermined threshold publisher revenue value for publishers in the respective publisher group and the corresponding predetermined threshold amount of third-party content for client computer devices in the respective device group.

5. The method of claim 4, comprising:
determining the corresponding selection score threshold for each group pair by computing an estimate of the corresponding selection score threshold and iteratively:
identifying publishers in the respective publisher group for which expected revenues are below the corresponding predetermined threshold publisher revenue value for publishers in the respective publisher group;
adjusting the estimate of the corresponding selection score threshold for client device-publisher pairs associated with the identified publishers, the adjusted estimate causing the expected publisher revenues for the identified publishers to exceed the corresponding predetermined threshold publisher revenue value for publishers in the respective publisher group; and
re-computing the corresponding selection score threshold for client device-publisher pairs not associated with previously identified publishers.

6. The method of claim 1, comprising:
maximizing weighted averages of economic efficiency for third-party content providers and publisher revenues.

7. The method of claim 1, wherein the at least one statistical parameter includes a representation of a joint probability density function of the selection score.

8. The method of claim 1, comprising:
obtaining, by the data processing system, data associated with previous bids made in association with each device group of the plurality of device groups and each publisher group of the plurality of publisher groups; and
computing the at least one statistical parameter based on the data associated with the previous bids.

9. A data processing system comprising:
a memory storing computer code instructions; and
a processor configured, upon executing the computer code instructions, to:
determine at least one statistical parameter indicative of a joint probability distribution of a selection score among a plurality of publisher groups and a plurality of device groups, each publisher group of the plurality of publisher groups including one or more respective publishers and each device group of the plurality of device groups including one or more respective client computer devices that have selected to receive context-based third-party content, for each group pair including a device group of the plurality of device groups and a publisher group of the plurality of device groups, the joint probability distribution indicative of a probability of the selection score being associated with devices of the device group in the group pair and publishers of the publisher group in the group pair;
obtain an indication of a predetermined threshold amount of third-party content for display to a client computer device in a first device group of the plurality of device groups;
obtain a predetermined threshold publisher revenue value for a publisher in a first publisher group of the plurality of publisher groups;
determine a selection score threshold of the selection score specific to a group pair including the first device group and the first publisher group based on the at least one statistical parameter indicative of the joint probability distribution of the selection score, the predetermined threshold amount of third-party content for display to the client computer device, and the predetermined threshold publisher revenue value for the publisher;
receive one or more bids for providing third-party content for display on the client computer device with content associated with the publisher, each bid associated with a respective third-party content item;
determine a bidding score for each third-party content item associated with a respective bid;
determine that at least one of the one or more bidding scores exceeds or is equal to the selection score threshold; and
select a third-party content item associated with a bidding score exceeding or equal to the selection criterion threshold value as a candidate for display to the client computer device with the content associated with the publisher.

10. The data processing system of claim 9, wherein the selection score threshold includes a minimum bid value.

11. The data processing system of claim 9, wherein the one or more bids include one or more first bids associated with a first auction, the one or more third-party content items include one or more first third-party content items and the one or more bidding scores include one or more first bidding scores, the processor is further configured to:
receive one or more second bids, associated with a second auction, for providing other third-party content for display on the client computer device with other content associated with the publisher, each second bid associated with a respective second third-party content item;
determine a second bidding score for each second third-party content item;
determine that none of the one or more second bidding scores exceeds or is equal to the selection score threshold; and
provide none of the one or more second content items for display on the client computer device with the other content associated with the publisher.

12. The data processing system of claim 9, wherein the processor is further configured to:
obtain, for each device group of the plurality of device groups, an indication of a corresponding predetermined threshold amount of third-party content for display to client computer devices in that device group;
obtain, for each publisher group of the plurality of publisher groups, a corresponding predetermined threshold publisher revenue value for publishers in that publisher group;
determine, for each group pair including a respective device group and a respective publisher group, a corresponding selection score threshold for client device-publisher pairs associated with the group pair based on the at least one statistical parameter, the corresponding predetermined threshold publisher revenue value for publishers in the respective publisher group and the corresponding predetermined threshold amount of third-party content for client computer devices in the respective device group; and
determine, for each group pair including a respective device group and a respective publisher group, a corresponding selection score threshold for client device-publisher pairs associated with the group pair based on the statistical parameter, the corresponding predetermined threshold publisher revenue value for publishers in the respective publisher group and the corresponding predetermined threshold amount of third-party content for client computer devices in the respective device group.

13. The data processing system of claim 12, wherein the processor is further configured to:
determine the corresponding selection score threshold for each group pair by computing an estimate of the corresponding selection score threshold and iteratively:
identify publishers in the respective publisher group for which expected revenues are below the corresponding predetermined threshold publisher revenue value for publishers in the respective publisher group;
adjust the estimate of the corresponding selection score threshold for client device-publisher pairs associated with the identified publishers, the adjusted estimate causing the expected publisher revenues for the identified publishers to exceed the corresponding predetermined threshold publisher revenue value for publishers in the respective publisher group; and
re-compute the corresponding selection score threshold for client device-publisher pairs not associated with previously identified publishers.

14. The data processing system of claim 11, wherein the processor is further configured to:
maximize weighted averages of economic efficiency for third-party content providers and publisher revenues.

15. The data processing system of claim 9, wherein the at least one statistical parameter includes a representation of a joint probability density function of the selection score.

16. The data processing system of claim 9, wherein the processor is further configured to:
obtain data associated with previous bids made in association with each device group of the plurality of device groups and each publisher group of the plurality of publisher groups; and
compute the at least one statistical parameter based on the data associated with the previous bids.

17. A computer readable storage device storing instructions that, when executed by one or more processors, cause the one or more processors to perform operations comprising:
determining at least one statistical parameter indicative of a joint probability distribution of a selection score among a plurality of publisher groups and a plurality of device groups, each publisher group of the plurality of publisher groups including one or more respective publishers and each device group of the plurality of device groups including one or more respective client computer devices that have selected to receive context-based third-party content, for each group pair including a device group of the plurality of device groups and a publisher group of the plurality of device groups, the joint probability distribution indicative of a probability of the selection score being associated with devices of the device group in the group pair and publishers of the publisher group in the group pair;
obtaining an indication of a predetermined threshold amount of third-party content for display to a client computer device in a first device group of the plurality of device groups;
obtaining, by the data processing system, a predetermined threshold publisher revenue value for a publisher in a first publisher group of the plurality of publisher groups;
determining a selection score threshold of the selection score specific to a group pair including the first device group and the first publisher group based on the at least one statistical parameter indicative of the joint probability distribution of the selection score, the predetermined threshold amount of third-party content for display to the client computer device, and the predetermined threshold publisher revenue value for the publisher;
receiving one or more bids for providing third-party content for display on the client computer device with content associated with the publisher, each bid associated with a respective third-party content item;
determining a bidding score for each third-party content item associated with a respective bid;
determining that at least one of the one or more bidding scores exceeds or is equal to the selection score threshold; and
selecting a third-party content item associated with a bidding score exceeding or equal to the selection score threshold as a candidate for display to the client computer device with the content associated with the publisher.

18. The computer readable storage device of claim 17, wherein the one or more bids include one or more first bids associated with a first auction, the one or more third-party content items include one or more first third-party content items and the one or more bidding scores include one or more first bidding scores, the operations comprising:
receiving one or more second bids, associated with a second auction, for providing other third-party content for display on the client computer device with other content associated with the publisher, each second bid associated with a respective second third-party content item;
determining a second bidding score for each second third-party content item;
determining that none of the one or more second bidding scores exceeds or is equal to the selection score threshold; and
providing none of the one or more second content items for display on the client computer device with the other content associated with the publisher.

19. The computer readable storage device of claim 17, wherein the operations further include:
obtaining, for each device group of the plurality of device groups, an indication of a corresponding predetermined threshold amount of third-party content for client computer devices in that device group;
obtaining, for each publisher group of the plurality of publisher groups, a corresponding predetermined threshold publisher revenue value for publishers in that publisher group; and
determining, for each group pair including a respective device group and a respective publisher group, a corresponding selection score threshold for client device-publisher pairs associated with the group pair based on the at least one statistical parameter, the corresponding predetermined threshold publisher revenue value for publishers in the respective publisher group and the corresponding predetermined threshold amount of third-party content for client computer devices in the respective device group.

20. The computer readable storage device of claim 19, wherein the operations further include:
determining the corresponding selection score threshold for each group pair by computing an estimate of the corresponding selection score threshold and iteratively:
identifying publishers in the respective publisher group for which expected revenues are below the corresponding predetermined threshold publisher revenue value for publishers in the respective publisher group;

adjusting the estimate of the corresponding selection score threshold for client device-publisher pairs associated with the identified publishers, the adjusted estimate causing the expected publisher revenues for the identified publishers to exceed the corresponding predetermined threshold publisher revenue value for publishers in the respective publisher group; and re-computing the corresponding selection score threshold for client device-publisher pairs not associated with previously identified publishers.

* * * * *